US009671857B2

United States Patent
Vanka et al.

(10) Patent No.: US 9,671,857 B2
(45) Date of Patent: Jun. 6, 2017

(54) APPARATUS, SYSTEM AND METHOD FOR DYNAMIC POWER MANAGEMENT ACROSS HETEROGENEOUS PROCESSORS IN A SHARED POWER DOMAIN

(71) Applicant: Qualcomm Incorporated, San Diego, CA (US)

(72) Inventors: Krishna V. S. S. S. R Vanka, Hyderabad (IN); Hee Jun Park, San Diego, CA (US); Sravan Kumar Ambapuram, Hyderabad (IN); Shirish Kumar Agarwal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 14/266,642

(22) Filed: Apr. 30, 2014

(65) Prior Publication Data
US 2015/0277536 A1    Oct. 1, 2015

Related U.S. Application Data

(60) Provisional application No. 61/970,290, filed on Mar. 25, 2014.

(51) Int. Cl.
*G06F 1/26* (2006.01)
*G06F 1/32* (2006.01)
*H04W 52/02* (2009.01)

(52) U.S. Cl.
CPC ............ *G06F 1/3296* (2013.01); *G06F 1/324* (2013.01); *G06F 1/3206* (2013.01); *G06F 1/329* (2013.01); *G06F 1/3234* (2013.01); *H04W 52/0251* (2013.01); *Y02B 60/1217* (2013.01); *Y02B 60/1285* (2013.01); *Y02B 60/50* (2013.01)

(58) Field of Classification Search
CPC .... G06F 1/3296; G06F 1/3206; G06F 1/3234; G06F 1/324; G06F 1/329; H04W 52/0251
USPC .................................................. 713/323, 320
See application file for complete search history.

(56) References Cited

U.S. PATENT DOCUMENTS

| | | | |
|---|---|---|---|
| 6,802,014 B1 * | 10/2004 | Suurballe | G06F 1/3203 307/31 |
| 6,952,748 B1 | 10/2005 | Guerrero, Jr. et al. | |
| 7,373,540 B2 | 5/2008 | Kim | |

(Continued)

FOREIGN PATENT DOCUMENTS

WO    2009015326 A2    1/2009

OTHER PUBLICATIONS

International Search Report and Written Opinion—PCT/US2015/022326—ISA/EPO—Jun. 17, 2015.

*Primary Examiner* — Robert Cassity
(74) *Attorney, Agent, or Firm* — Smith Tempel Blaha LLC

(57) ABSTRACT

Systems and methods for dynamically adjusting an input parameter to a power domain in a portable computing device are disclosed. The power domain includes two or more processing resources that share a power source. Dynamic use of the two or more processing resources creates an opportunity to adjust the input parameter when a status change associated with a processing resource in the power domain occurs. A controller in the power domain includes logic that responds to a status indicator associated with a respective processing resource in the power domain by generating a control signal that directs a device to adjust one or both of input voltage and clock frequency.

30 Claims, 8 Drawing Sheets

(56) References Cited

U.S. PATENT DOCUMENTS

| | | | |
|---|---|---|---|
| 8,051,320 B2 | 11/2011 | Knoth | |
| 8,347,130 B2 | 1/2013 | Park | |
| 8,370,663 B2 | 2/2013 | Frid et al. | |
| 8,547,164 B2 | 10/2013 | Flores et al. | |
| 2005/0005073 A1 | 1/2005 | Pruvost et al. | |
| 2006/0123251 A1* | 6/2006 | Nakajima | G06F 1/3203 713/300 |
| 2008/0162770 A1* | 7/2008 | Titiano | G06F 1/3203 710/309 |
| 2009/0144578 A1 | 6/2009 | Tatsumi | |
| 2015/0006918 A1* | 1/2015 | Page | G06F 1/26 713/300 |
| 2015/0370316 A1 | 12/2015 | Park | |

\* cited by examiner

APPARATUS, SYSTEM AND METHOD FOR DYNAMIC POWER MANAGEMENT ACROSS HETEROGENEOUS PROCESSORS IN A SHARED POWER DOMAIN

RELATED APPLICATION

The present application claims priority to and the benefit of the filing date of U.S. Provisional Application No. 61/970,290, entitled "Apparatus, System and Method for Dynamic Power Management Across Heterogeneous Processors in a Shared Power Domain" filed on Mar. 25, 2014, the entirety of which is incorporated into this document by reference.

DESCRIPTION OF THE RELATED ART

Computing devices are ubiquitous. Some computing devices are portable such as smartphones, tablets and laptop computers. In addition to the primary function of these devices, many include elements that support peripheral functions. For example, a cellular telephone may include the primary function of enabling and supporting cellular telephone calls and the peripheral functions of a still camera, a video camera, a music player, global positioning system (GPS) navigation, web browsing, sending and receiving emails, sending and receiving text messages, push-to-talk capabilities, etc.

Some conventional designs for handheld portable computing devices include multiple processors and/or processors with multiple cores to support the various primary and peripheral functions desired for a particular computing device. Such designs often further integrate analog, digital and radio-frequency circuits or functions on a single substrate and are commonly referred to as a system on a chip (SoC). These different circuits and functions will often require different operating frequencies and voltage levels and are at times segregated based on common input requirements. When such segregation is based on input voltage the different circuits may share a common power source.

The desire to conserve energy stored in a battery that provides power to such portable devices has led to the implementation of dynamic power management techniques. These techniques include adjusting the clock frequency, the input voltage, or both to achieve a desired circuit performance.

A conventional multiple core power reduction technology applied in a SoC design scales input voltage as a function of measured circuit performance to compensate for semiconductor manufacturing process variation to achieve a desired target performance. When the multiple cores or functional blocks in a single power domain have different responses to the same input voltage, the core or functional block that responds the slowest dictates the input voltage that is required. Accordingly, the input voltage necessary to achieve the desired performance is applied to the power domain.

FIG. 1 includes a plot 10 of voltage and frequency as applied to a test circuit integrated in separate semiconductors. Input voltage is shown along the horizontal axis while the frequency response of the test circuit is shown along the vertical axis. The responsiveness of a test circuit in a first semiconductor die is depicted by line 12, while the responsiveness of a respective test circuit in the second semiconductor die is shown by line 14. The first test circuit in the first semiconductor die responds in less time and at a lower input voltage than an identical test circuit in the second semiconductor die. As shown in the plot, when a reference voltage $V_{REF}$ is applied, the fast silicon can achieve a frequency (e.g., f1_measured) that exceeds a target frequency, f_target. As further shown in the plot, a supply voltage $V_{REF}-V_1$ applied to the test circuit of the first semiconductor die enables the test circuit to achieve the target operating frequency. Conversely, when $V_{REF}$ is applied to the second semiconductor die, the test circuit achieves a frequency f2_measured that is lower than the target frequency. A supply voltage $V_{REF}+V_2$ must be applied to the second semiconductor die to enable the test circuit to achieve the target frequency. Under these circumstances, the first semiconductor die is often referred to as having "fast" silicon, while the second semiconductor die is described as having "slow" silicon. As further illustrated in FIG. 1, the variation between the respective responsiveness of the first and second semiconductor dice shows that in order to achieve a desired or target frequency across both dies, the input voltage required for the slow silicon to achieve the target frequency is required. Thus, the fast silicon will be operated with a voltage margin that is the equivalent of the sum of $V_1$ and $V_2$.

The switching power dissipated by a semiconductor using static CMOS gates is $C \times V^2 \times f$, where C is the capacitance being switched per clock cycle, V is the supply voltage, and f is the switching frequency, so this part of the power consumption decreases quadratically with changes in supply voltage. The formula is not exact however, as many modern digital signal processors (DSPs) and multiple core processors are not implemented with only CMOS, but also use special memory circuits, dynamic logic such as domino logic, etc. Moreover, there is also a static leakage current, which has become more and more accentuated as semiconductor device feature sizes become smaller and threshold levels decrease.

Accordingly, dynamic voltage scaling is widely used in strategies to manage switching power consumption in battery powered devices. Low voltage modes are used in conjunction with lowered clock frequencies to minimize power consumption associated with components such as multiple core processors and DSPs. When a desired performance demands significant computational power, the voltage and frequency are increased.

However, these conventional techniques are not responsive to use of the portable computing device as it affects the multiple cores or disparate functional blocks within a power domain. In a power domain, each processing resource shares a common power source.

For example, in the case of a portable smartphone, for a majority of time that the device is powered on, many of the functional units and processing cores will be in a low-power consumption state or may even be powered off, while select processing cores or select functional circuits are powered and used in a shared power domain During some use cases, some cores or functional circuits will be powered and used and after a time may no longer be required and are powered off or returned to a low-power state.

FIG. 2 illustrates a conventional power domain 20 where shared clock and input voltages are distributed to multiple processing resources or cores. As shown, a bus 18 provides a periodic signal at a respective clock input to processing cores 22-28. A core power reduction controller (or CPR controller) 15 receives a first voltage from a power supply and in response to a control signal from one or more sensors, provides an adjusted voltage on bus 16. The adjusted voltage is distributed to each of switches 21-27 arranged to controllably provide the adjusted voltage to the respective processing cores 22-28. As further indicated in FIG. 2, core 22 requires an input voltage of $V_{REF}+V_2$ to achieve the desired responsiveness corresponding to f_target. In contrast, core 24 requires an input voltage of $V_{REF}+V_2-X$ to achieve the desired responsiveness for the power domain. Whereas, core 26 and core 28 require an input voltage of $V_{REF}+V_2-2X$ to achieve the desired responsiveness.

At a given instant, the portable computing device may need the computing resources of each of the cores at a desired clock frequency. As shown in FIG. 1, the conventional power management technique of FIG. 2 will apply an input voltage $V_{IN}=(V_{REF}+V_2)$ so that each core in the power domain can support the desired target frequency. At a later time the portable computing device may no longer need the computing resources of each of the cores. However, the conventional power distribution design for a power domain continues to apply a higher input voltage than required for these faster cores. This higher input voltage is applied even when one or more cores are in a standby or pow-power mode.

Thus, there is a need for improved mechanisms for conserving power within a power domain.

SUMMARY OF THE DISCLOSURE

Systems and methods for dynamically adjusting an input to a power domain in a portable computing device are disclosed. The power domain includes two or more processing resources that share a power source. Dynamic use of the two or more processing resources creates an opportunity to adjust the input when a status change associated with a processing resource in the power domain occurs. A controller in the power domain includes logic that responds to a status indicator associated with a respective processing resource in the power domain. The controller logic generates a signal that directs a device to adjust one or both of an input voltage and a clock frequency.

An example embodiment includes a portable computing device with a power domain. The power domain includes processing resources that receive input power from a shared power source. A controller, coupled to at least two processing resources, is configured to receive information from a power manager. The controller uses resource state logic to generate a first control signal used by a power supply to provide a desired input voltage to the power domain.

One example embodiment includes a portable computing device with a power domain controller coupled to processing resources. The power domain controller receives information from a modified sensor chain signal protocol. The sensors in the chain embed information about the operational state of a respective circuit region or functional block. The information includes one or both of a power state and a clock frequency. The controller receives the information and responds accordingly. For example, the power domain controller may mask or ignore sensor information from a select processing resource that is in an off state. In another example, the power domain controller may turn the sensor off or bypass the sensor when the respective processing resource is in an off state.

In still another example embodiment, the controller includes affinity logic that identifies a preference for one or more processing resources within the power domain under certain conditions. The controller generates a second control signal that communicates this information to a scheduler that allocates tasks to the identified processing resources. The scheduler can be used to manage heterogeneous functional blocks across distinct power domains and for use cases that demand coordination between processing resources located in separate power domains.

Another example embodiment is a method for dynamically controlling a power domain in a portable computing device. The power domain includes processing resources that share a power source. The method includes the steps of identifying a present condition of at least two processing resources in a power domain in a portable computing device, in response to a change in the present condition, initiating an adjustment of an input and applying the input to the power domain.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
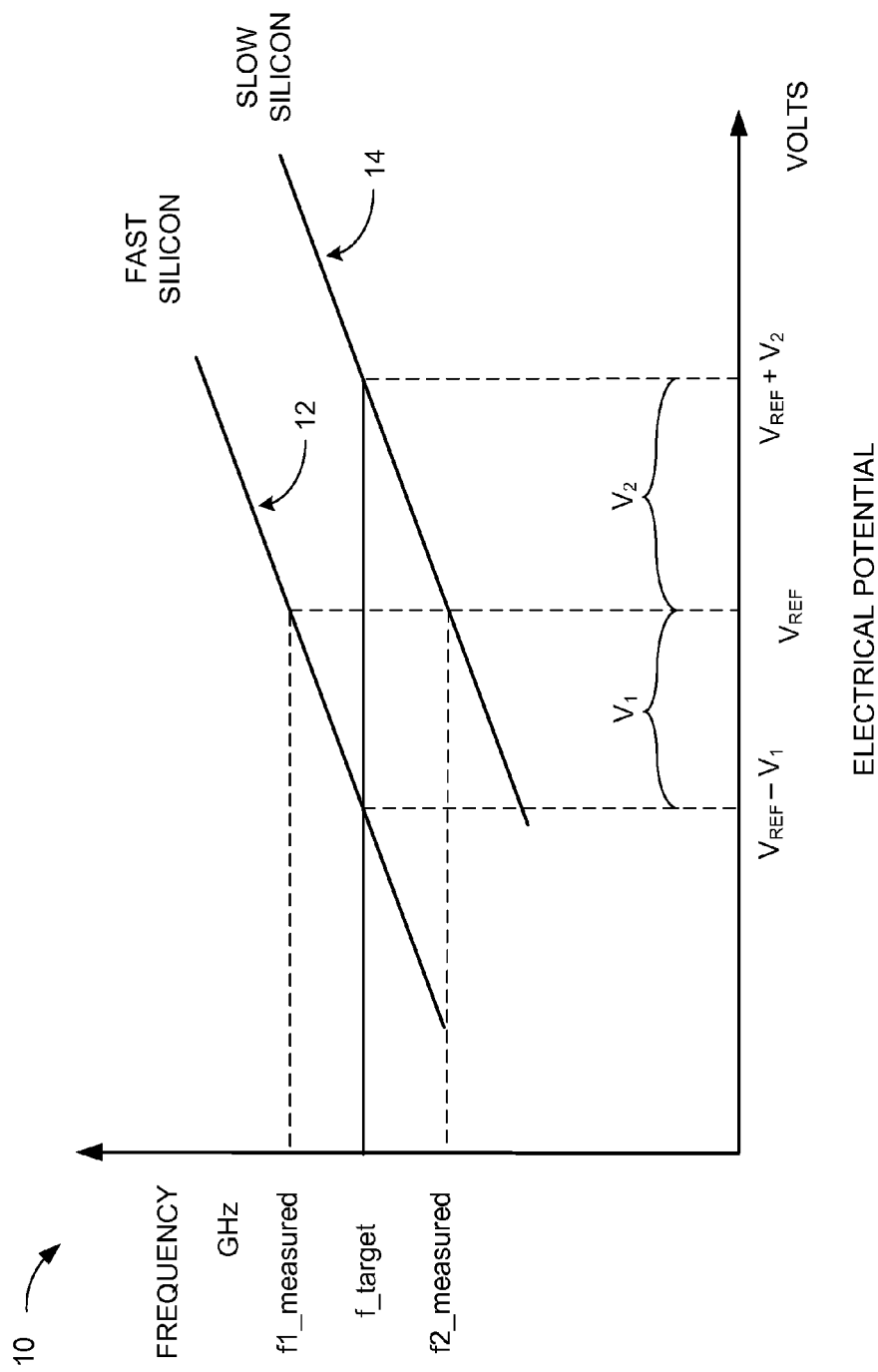
FIG. 1 is a plot of electrical potential and frequency as applied to a test circuit integrated in separate semiconductors.
Figure 2:
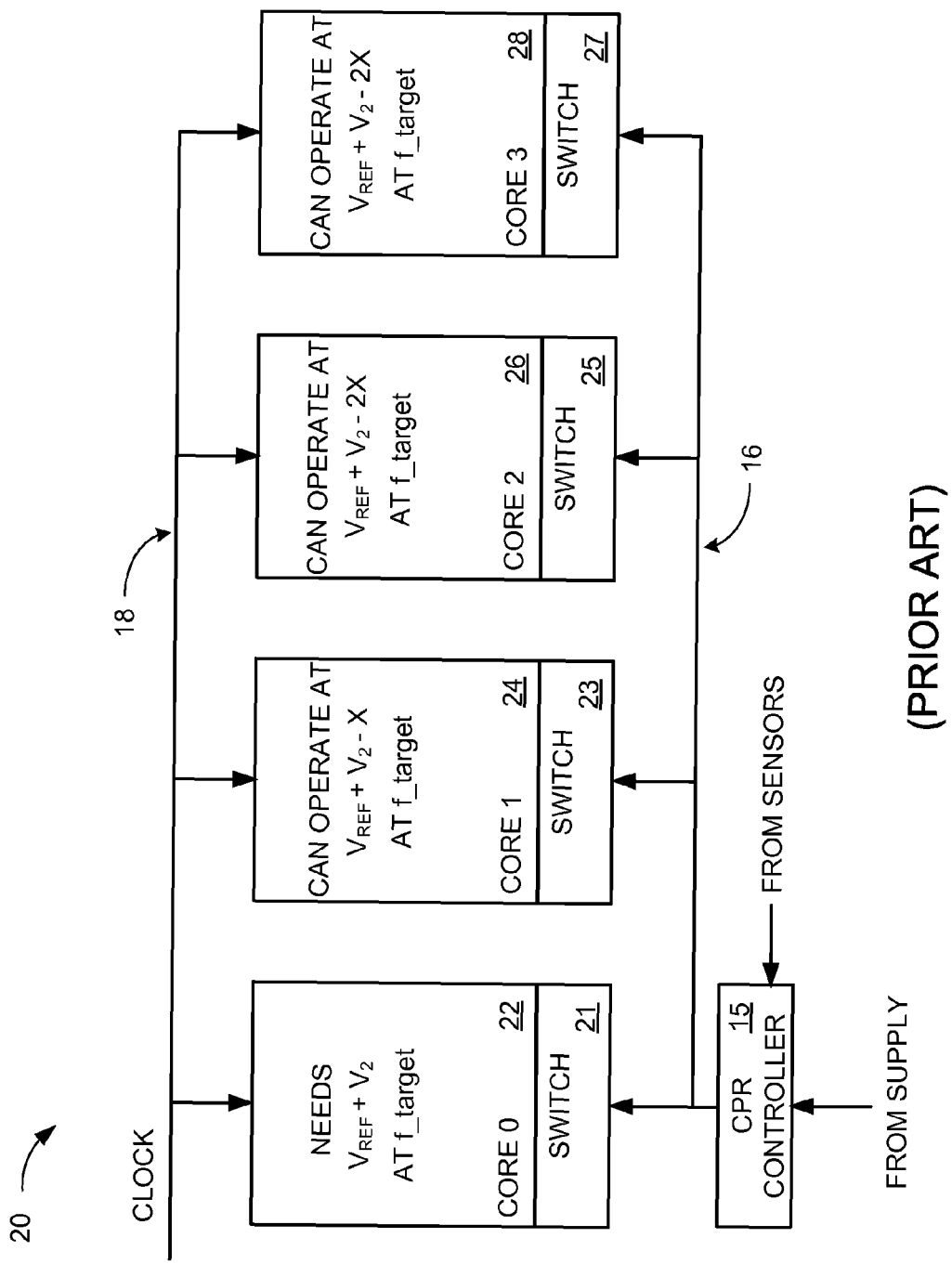
FIG. 2 is schematic diagram illustrating an example embodiment of a conventional power reduction technique in a power domain including four core processors.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" or PCD is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

Systems and methods for dynamically adjusting an input parameter to a power domain in a portable computing device are disclosed. The power domain includes two or more processing resources that share a power source. Dynamic use of the two or more processing resources creates an opportunity to adjust the input parameter when a status change associated with a processing resource in the power domain occurs. A controller in the power domain includes logic that responds to a status indicator associated with a respective processing resource in the power domain by generating a control signal that directs a device to adjust one or both of input voltage and clock frequency.

In a first embodiment, the status indicator is received from a source outside the power domain. The status indicator indicates whether a corresponding processing resource is powered on, is powered off, or is in a low-power state. In a variation of this first embodiment, a multiple condition indicator includes information responsive to the input voltage and a clock frequency communicated to the power domain. In still another variation, multiple condition indicators include information responsive to the input voltage provided to the power domain as well as a clock frequency provided to each separate processing resource in the power domain.

In a second embodiment, a protocol used to communicate information from a series of sensors distributed across the power domain, including sensors integrated in each processing resource of the power domain, is modified to include information responsive to a power state of the respective processing resource. The information reflects whether the corresponding processing resource is powered on, is powered off, or is in a low-power state. In addition, the information may further include a clock frequency that is provided to each processing resource. When a sensor is in a processing resource that is powered off, the modified signal protocol may include a mask bit that instructs the power domain controller to ignore or mask information from the respective sensor. In an alternative of the second arrangement, the sensors in inactive functional blocks or processing resources are powered off and bypassed within the sensor chain.

In another embodiment, a power domain includes a controller arranged with both resource state logic and frequency tuning logic. The controller generates a second control signal that includes an affinity or preference for one or more processing resources in lieu of other processing resources in the power domain. The second control signal is communicated to a scheduler that uses the affinity or preference information to determine which processing resources are needed to meet a present demand. The scheduler may be embodied in circuits (hardware) or in software.

In additional embodiments, various disparate or heterogeneous processing resources that receive power over a shared power bus define a power domain. When these additional embodiments include a video processor and a display processor, during idle times a domain controller can adjust the input voltage on the shared power bus to reduce the power expended to achieve a desired performance.

Although described with particular reference to operation within a PCD, the described power management systems and methods are applicable to any computing system with one or more separate power domains that include functional circuits with disparate responsiveness characteristics to an input voltage. Stated another way, the power management systems and methods are applicable to desktop computers, server computers or any electronic device with processing resources that are powered by a shared power supply that provides a single input voltage to the processing resources.

Figure 3:
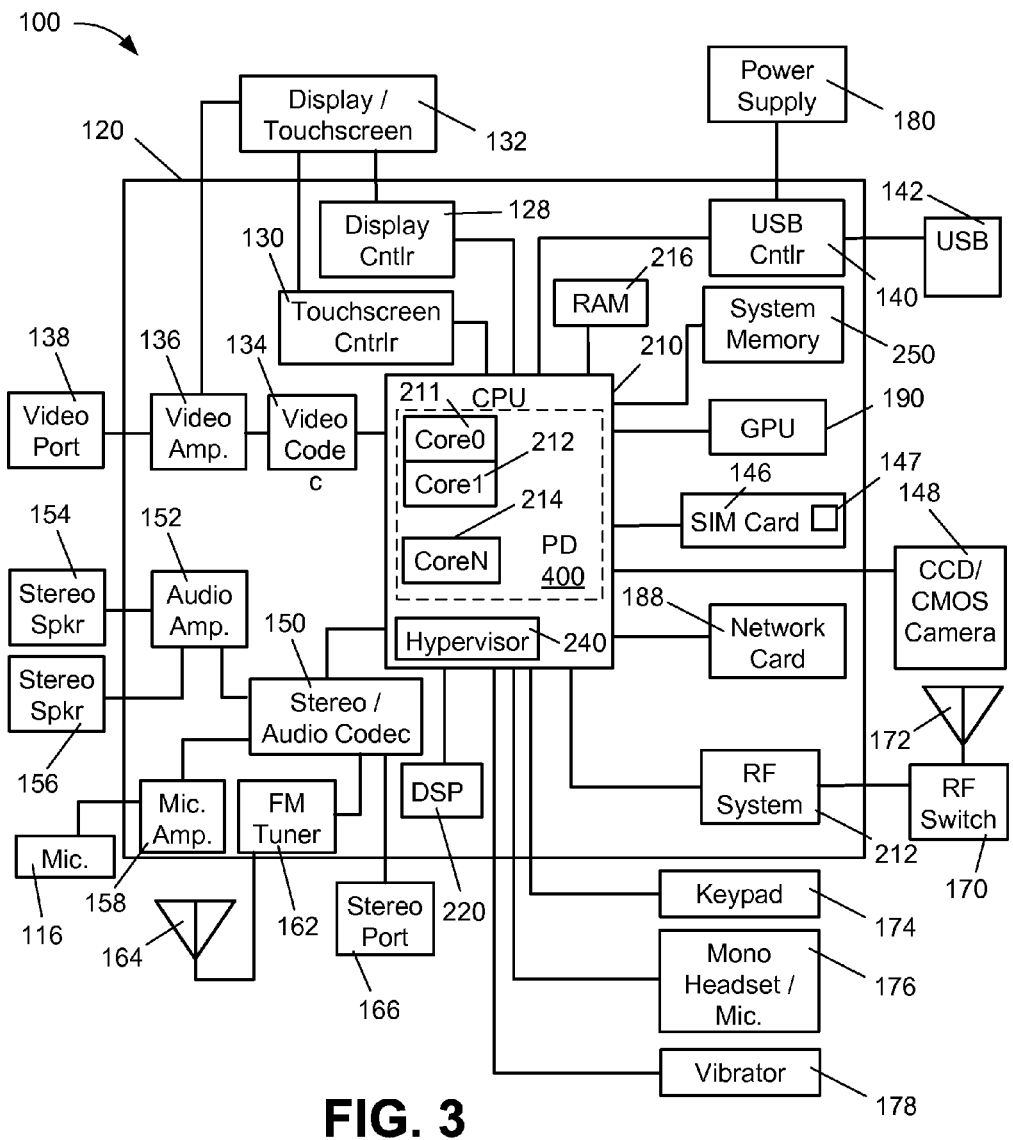
FIG. 3 is a schematic diagram illustrating an example portable computing device.

Reference is now directed to the illustrated examples. Referring initially to FIG. 3, an exemplary, non-limiting aspect of a portable computing device (PCD) is shown and is generally designated 100. As shown, the PCD 100 includes an on-chip system 120 that includes a multicore CPU 210. The multicore CPU 210 includes a zero$^{th}$ core 211, a 1$^{st}$ or first core 212, and an N$^{th}$ core 214. The cores or processing resources 211-214 are elements within an improved power domain 400.

The improved power domain 400 may operate autonomously or may be operated under a control scheme enabled by a hypervisor 240. The hypervisor 240 records status information associated with select elements of the on-chip system 120, such as but not limited to the digital signal processor (DSP) 220 and the graphical processor unit (GPU) 190 and in some arrangements other select peripheral elements in support of one or more power management techniques that may be applied in real time to reduce power consumption on the portable computing device 100. The architecture and operation of the improved power domain 400 are further described in association with the description of example embodiments shown in FIGS. 4-7.

As illustrated in FIG. 3, a display controller 128 and a touch screen controller 130 are coupled to the multicore CPU 210. In turn, display/touchscreen 132, external to the on-chip system 120, is coupled to the display controller 128 and the touch screen controller 130. A video CODEC 134, e.g., a phase alternating line (PAL) encoder, a sequential couleur a memoire (SECAM) encoder, or a national television system(s) committee (NTSC) encoder, is coupled to the multicore CPU 210. Further, a video amplifier 136 is coupled to the video CODEC 134 and the display/touchscreen 132. Also, a video port 138 is coupled to the video amplifier 136. As depicted in FIG. 3, a universal serial bus (USB) controller 140 is coupled to the multicore CPU 210. Also, a USB port 142 is coupled to the USB controller 140.

A system memory 250 and a subscriber identity module (SIM) card 146 may also be coupled to the multicore CPU 210. The hypervisor 240 executes one or more algorithms in accordance with instructions stored in the system memory 250 or in an alternative non-volatile memory element (not shown). Further, as shown in FIG. 3, a digital camera 148 may be coupled to the multicore CPU 210. In an exemplary aspect, the digital camera 148 is a charge-coupled device (CCD) camera or a complementary metal-oxide semiconductor (CMOS) camera.

As further illustrated in FIG. 3, a stereo audio CODEC 150 may be coupled to the multicore CPU 210. Moreover, an audio amplifier 152 may be coupled to the stereo audio CODEC 150. In an exemplary aspect, a first stereo speaker 154 and a second stereo speaker 156 are coupled to the audio amplifier 152. FIG. 3 shows that a microphone amplifier 158 may be also coupled to the stereo audio CODEC 150. Additionally, a microphone 116 may be coupled to the microphone amplifier 158. In a particular aspect, a frequency modulation (FM) radio tuner 162 may be coupled to the stereo audio CODEC 150. Also, a FM antenna 164 is coupled to the FM radio tuner 162. Further, a stereo port 166 may be coupled to the stereo audio CODEC 150.

FIG. 3 also indicates that a radio frequency (RF) system or transceiver 212 is coupled to the multicore CPU 210. An RF switch 170 may be coupled to the RF transceiver 212 and an RF antenna 172. As shown in FIG. 3, a keypad 174 is coupled to the multicore CPU 210. Also, a mono headset with a microphone 176 may be coupled to the multicore CPU 210. Further, a vibrator device 178 may be coupled to the multicore CPU 210. FIG. 3 further shows that a power supply 180 may be coupled to the on-chip system 120 via the USB controller 140. In a particular aspect, the power supply 180 is a direct current (DC) power supply that provides power to the various components of the PCD 100 that require power. Further, in a particular aspect, the power supply is a rechargeable DC battery or a DC power supply that is derived from an alternating current (AC) to DC transformer that is connected to an AC power source.

FIG. 3 further indicates that the PCD 100 may also include a network card 188 that may be used to access a data network, e.g., a local area network, a personal area network, or any other network. The network card 188 may be a Bluetooth network card, a WiFi network card, a personal area network (PAN) card, or any other network card well known in the art. Further, the network card 188 may be incorporated in an integrated circuit. That is, the network card 188 may be a full solution in a chip, and may not be a separate network card 188.

As depicted in FIG. 3, the display/touchscreen 132, the video port 138, the USB port 142, the camera 148, the first stereo speaker 154, the second stereo speaker 156, the microphone 116, the FM antenna 164, the stereo port 166, the RF switch 170, the RF antenna 172, the keypad 174, the mono headset 176, the vibrator 178, and the power supply 180 are external to the on-chip system 120.

RF system or transceiver 212, which may include one or more modems, may support one or more of global system for mobile communications ("GSM"), code division multiple access ("CDMA"), wideband code division multiple access ("W-CDMA"), time division synchronous code division multiple access ("TDSCDMA"), long term evolution ("LTE"), and variations of LTE such as, but not limited to, FDB/LTE, PDD/LTE, and future wireless protocols. In the illustrated embodiment, the RF system 212 is integrated with the on-ship system 120. In alternative embodiments, the RF system 212 and the RF switch 170 may be supported in an integrated RF module separate from the on-ship system 120. In still other embodiments, both the RF system 212 and the RF switch 170 are separate from the on-ship system 120 and from each other.

In the illustrated embodiment, a single instance of a multi-core CPU 210 is depicted. However, it should be understood that any number of similarly configured multi-core CPUs can be included to support the various peripheral devices and functions associated with the PCD 100. Alternatively, a single processor or multiple processors each having a single arithmetic logic unit or core could be deployed in a PCD 100 or other computing devices to support the various peripheral devices and functions associated with the PCD 100 as may be desired.

In a particular aspect, one or more of the method steps described herein may be enabled via a combination of data and processor instructions stored in the system memory 250. These instructions may be executed by the multicore CPU 210 in order to perform the methods described herein. Further, the multicore CPU 210, the system memory 250, an EEPROM (not shown) or a combination thereof may serve as a means for storing a non-transitory representation of power management logic, including resource state logic, frequency tuning logic, responsiveness data and configuration parameters for executing one or more of the method steps described herein.

Figure 4:
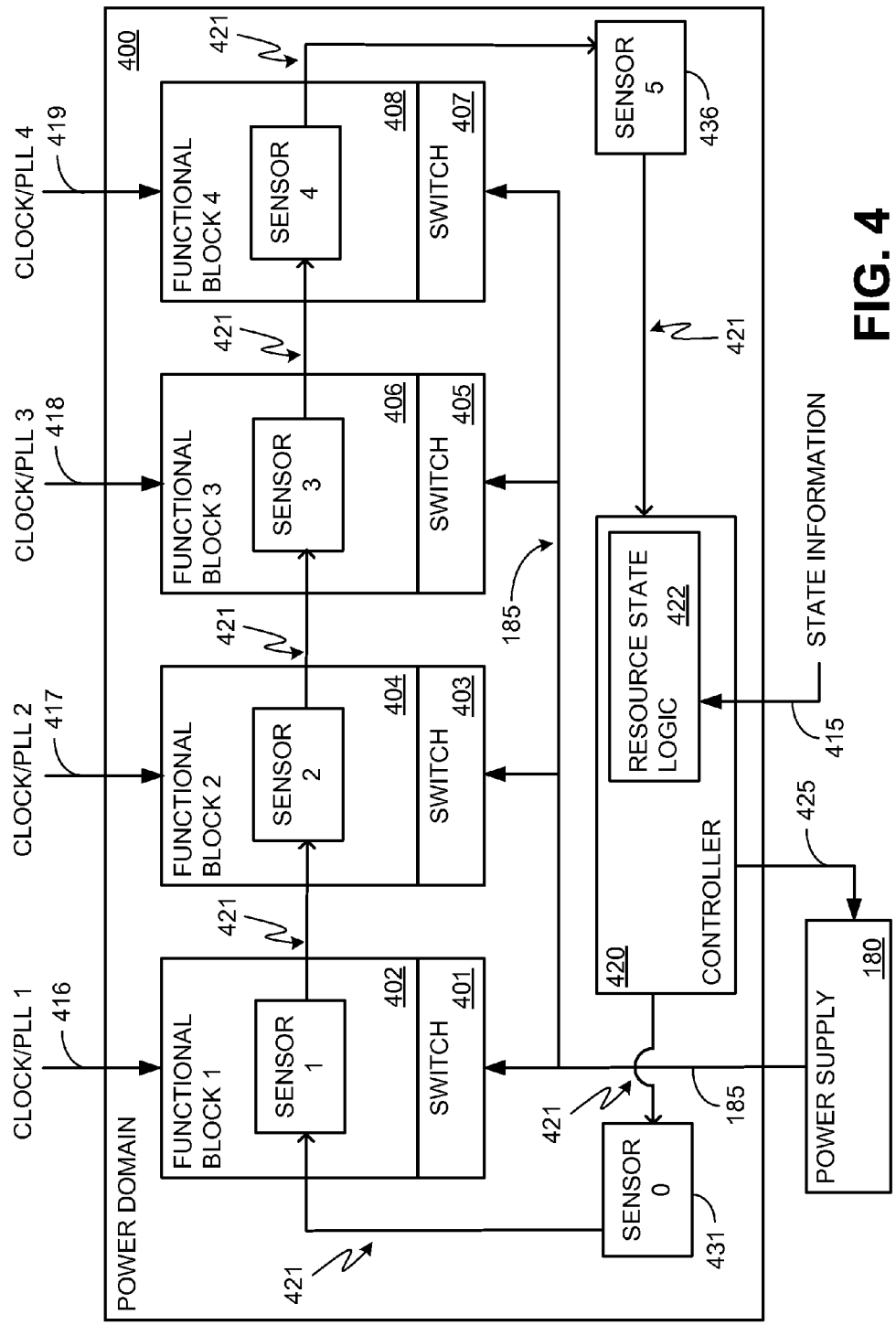
FIG. 4 is a schematic diagram illustrating an embodiment of a modified power domain with resource state logic.

FIG. 4 is a schematic diagram illustrating a modified or improved power domain or power domain 400. The power domain 400 is coupled to a power supply 180 and multiple clock signals. In the illustrated embodiment, the power domain 400 receives a respective clock signal for each processing resource. Each of the functional blocks 402-408 separately represent at least one processing resource. A first clock signal input 416 is coupled to a first functional block 402. A second clock signal input 417 is coupled to a second functional block 404. A third clock signal input 418 is coupled to a third functional block 406. A fourth clock signal input 419 is coupled to a fourth functional block 408. The respective clock signal inputs 416-419 are responsive to control inputs communicated from the hypervisor 240 to the respective phase-locked loop clock source. In alternative embodiments, the power domain 400 may be arranged with two, three or more than four functional blocks. Among these alternative embodiments a clock signal source may be shared among functional blocks that respond similarly to variations in the input voltage.

In the illustrated embodiment, the power domain 400 includes a bus 185 that provides a an adjustable input voltage to functional blocks 402-408 when a respective switch 401-407 is configured to convey the input voltage to the corresponding functional block. A controller 420 provides a control signal via connection 425 to the power supply 180. The control signal is responsive to state information communicated on connection 415 from a source external to the power domain 400. The controller 420 includes resource state logic 422, which is arranged to change the control signal in a manner that results in a desired voltage at the power supply output. The resource state logic 422 responds in a desired and consistent way to state information received on connection 415 by executing logic circuits and/or executable instructions that initiate or direct an adjustment to the control signal. State information includes whether each of the functional blocks 402-408 is powered on, off or alternatively when powered on, the state information may additionally include whether the functional blocks 402-408 are in a high-power, intermediate, standby or low-power state. The state information identifies a present condition of the processing resources or functional blocks 402-408 operating within the power domain 400. Stated another way, the resource state logic 422 is responsive to the presence of a respective supply voltage for processing resources in a power domain. The state information communicated on connection 415 may be generated in a system power manager enabled in a hardware or software (e.g., in a hypervisor 240) in the portable computing device 100.

In some embodiments the state information is a binary status (e.g., on or off; that is, power is applied or power is not applied). For example, a power applied state may be communicated when one of the switches 401-407 is closed. Whatever present condition is identified is associated in a respective one-to-one relationship with processing resources such as the functional blocks 402-408. When the state information further identifies a high-power, intermediate, standby or low-power state in addition to the powered on condition, this additional information is represented by more than a single binary bit. The adjusted or desired voltage is distributed to each of switches 401-407 to controllably provide the adjusted voltage to the respective functional blocks 402-408. Dynamic use of the functional blocks 402-408 creates an opportunity to adjust an input parameter, such as the input voltage, the frequency of a clock, or both when a status change or change in state associated with a functional block (i.e., a processing resource) in the power domain 400 occurs.

The state information or status indicator is received from a source outside the power domain 400. In a variation of this first embodiment, a multiple condition indicator includes information responsive to the input voltage and a clock frequency communicated to the power domain. In still another variation, multiple condition indicators include information responsive to the input voltage provided to the power domain 400 as well as a clock frequency provided to each separate processing resource in the power domain 400.

The power domain 400 is further arranged with a set of sensors arranged with test circuits configured to determine the responsiveness of circuits proximal to each of the respective sensors. As illustrated, the set of sensors are coupled in series with each other on a sensor bus 421 that starts and ends at the controller 420. Sensor 431 is located along the bus 421 in a circuit region between the controller 420 and functional block 402. Similarly, sensor 436 is located along the bus 421 in a circuit region between functional block 408 and the controller 420. Sensors located along the bus 421 are arranged to provide an indicator or index with the responsiveness data. The indicator or index defines a corresponding circuit region or functional block in the power domain 400. The provided responsiveness information from the various circuit regions outside the functional blocks or within the corresponding functional blocks 402-408 may be used by the resource state logic or other logic circuits in the controller 420 to adjust the control signal on connection 425. In some arrangements, the provided responsiveness information may be a measure of relative responsiveness of a first circuit region or functional block to a second circuit region or a second functional block.

Figure 5:
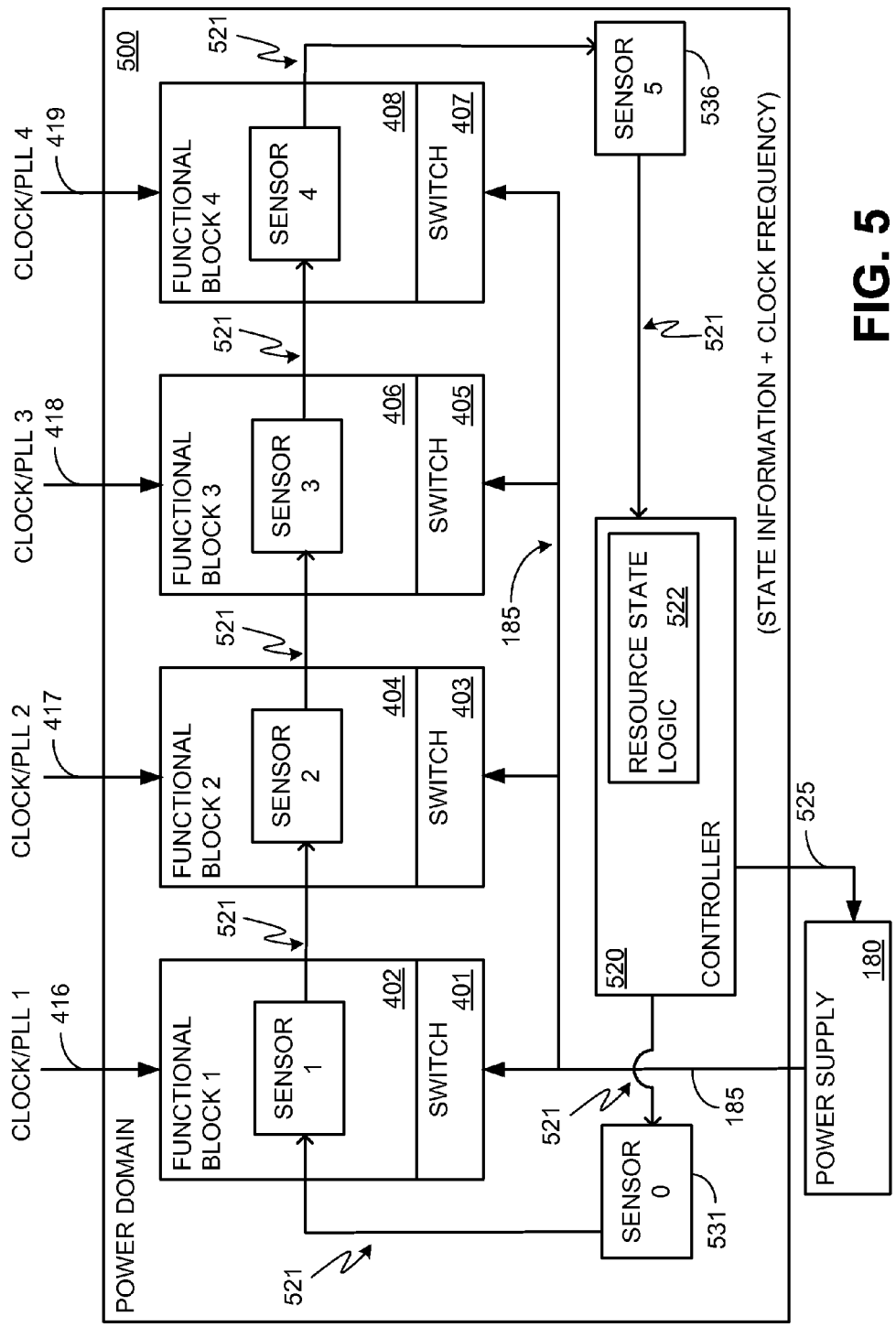
FIG. 5 is a schematic diagram of an alternative embodiment of a modified power domain.

FIG. 5 is a schematic diagram of an alternative embodiment of a modified power domain 500. The modified power domain 500 differs from the power domain 400 in that the power domain 500 is not arranged to receive state information from an external source. Instead of receiving state information from an external source such as a power management application or hypervisor 240, the modified power domain 500 receives state information and additional information from a modified sensor chain signal protocol. The sensors in the chain 521 embed information about the operational state of the respective functional block or in the case of sensor 531 or sensor 536 a circuit region not in a functional block 402-408 but still in the power domain 500. The information includes one or both of a power state and a clock frequency. In this instance, the controller 520 receives the state information and clock frequency and responds accordingly by adjusting the control signal on connection 525 in a desired way to achieve a desired input voltage on the bus 185.

For example, the controller 520 executes masking logic to identify particular sensor information that should be masked or ignored. When so masked or ignored, the sensor information from a corresponding processing resource or functional block 402-408 that is in an off state. In another example, the controller 520 turns a select sensor off and bypasses the sensor when the respective processing resource is in an off state. Although a bypass path or circuit is not shown for simplicity of illustration, it should be understood that one or more of the sensors distributed about the power domain 500 may be augmented by such a bypass circuit or path. When so provided, embedded state information and a respective clock frequency, when applicable, will be communicated along the bus 521, to avoid the bypassed sensor or sensors, on the way to the controller 520.

The state information identifies a present condition of the processing resources or functional blocks 402-408 operating within the power domain 500. Stated another way, the resource state logic 522 is responsive to the presence of a respective supply voltage for processing resources in a power domain. The state information communicated on bus 521 is communicated in accordance with a modified sensor chain signal protocol. IN some embodiments the state information is a binary status (e.g., on/off; that is, power applied or power is not applied). For example, a power applied state may be determined when one of the switches 401-407 is controllably directed to a closed position and an input voltage present on bus 185 is provided or supplied to the corresponding functional block. The present condition is associated in a one-to-one relationship with the respective functional block. When the state information further identifies a high, intermediate, or low-power state or condition in addition to the power on condition, the additional information is represented by more than a single binary bit.

Figure 6:
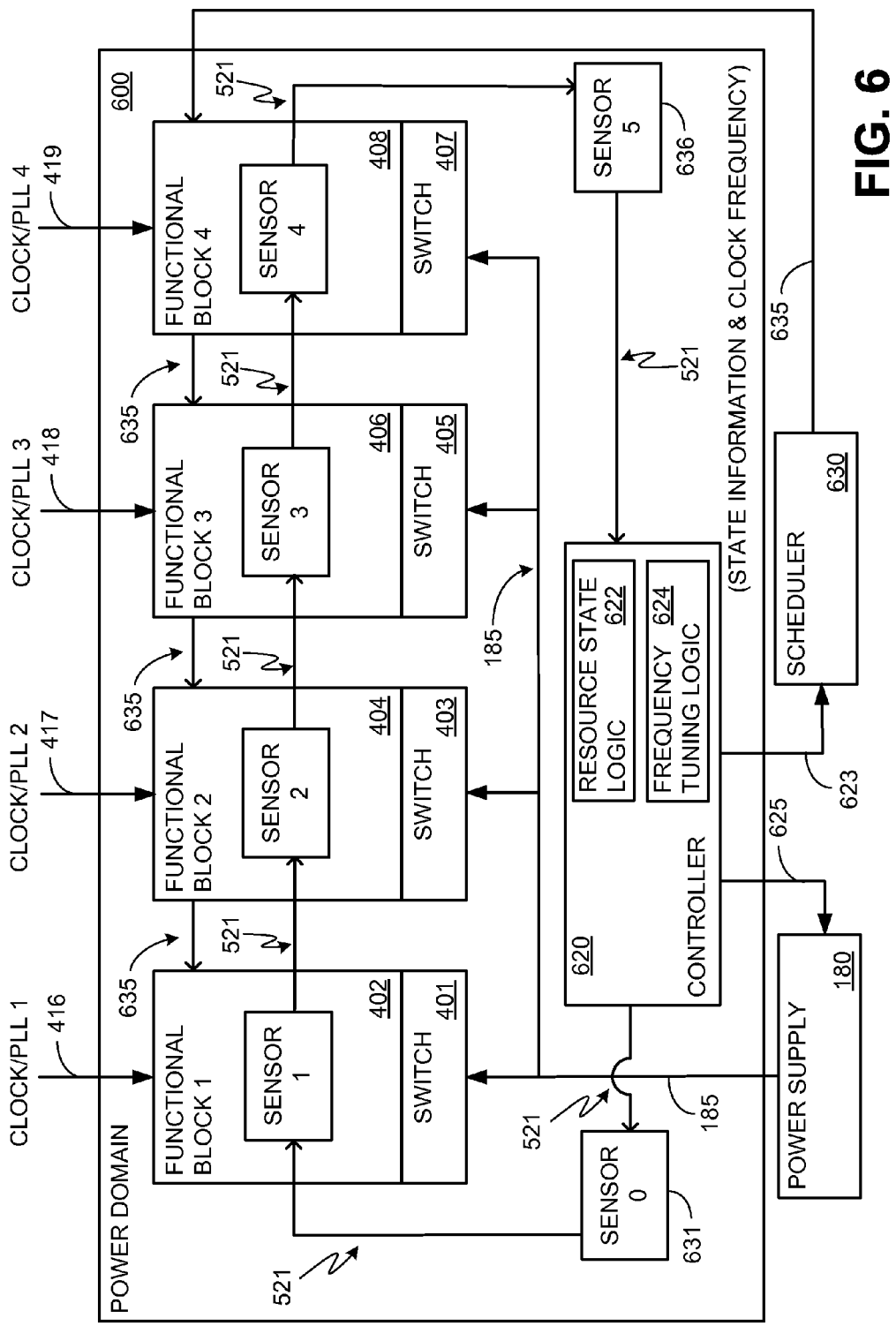
FIG. 6 is a schematic diagram of an embodiment of a modified power domain coupled to a scheduler.

FIG. 6 is a schematic diagram of another embodiment of a modified power domain 600. The modified power domain 600 differs from the power domain 500 in that the power domain 600 is arranged with a controller 620 with both resource state logic 622 and frequency tuning logic 624. The controller 620 generates a first control signal that is forwarded to the power supply 180 on the connection 625. The controller 620 further generates a second control signal communicated on connection 623 that includes an affinity or preference for one or more processing resources in lieu of other processing resources in the power domain 600. The second control signal is communicated to a scheduler 630 that uses the affinity or preference information to determine which processing resources or functional blocks are needed to meet a present performance demand. The scheduler 630 may be embodied in circuits (hardware) or in software such as in a power manager or hypervisor. However embodied, the scheduler 630 applies logic to assign tasks to processing resources. Task assignments are communicated in the form of control information communicated on connection 635 to each of the functional blocks 402-408 of the power domain 600 or alternatively to the clock signal sources coupled to each of connection 416-419.

As illustrated, a set of sensors are coupled in series with each other on a sensor bus 521 that starts and ends at the controller 620. Sensor 631 is located along the bus 521 in a circuit region between the controller 620 and functional block 402. Similarly, sensor 636 is located along the bus 521 in a circuit region between functional block 408 and the controller 620. Sensors located along the bus 521 provide an indicator or index with the responsiveness data. The indicator or index defines a corresponding circuit region or functional block in the power domain 600. The provided responsiveness information from the various circuit regions outside the functional blocks or within the corresponding functional blocks 402-408 is used by the resource state logic 622 in the controller 620 to adjust the first control signal on connection 625. In addition, sensors located within one or more of the functional blocks 402-408 may provide clock frequency information along the bus 521 to the frequency tuning logic 624 in the controller 620. The frequency tuning logic 624 uses the clock frequency information in conjunction with the state information to adjust the second control signal on connection 623. Although a bypass path or circuit is not shown for simplicity of illustration, it should be understood that one or more of the sensors distributed about the power domain 600 may be augmented by such a bypass circuit or path. When so provided, embedded state information and a respective clock frequency, when applicable, will be communicated along the bus 521, thereby avoiding the bypassed sensor or sensors, on the way to the controller 620.

Figure 7:
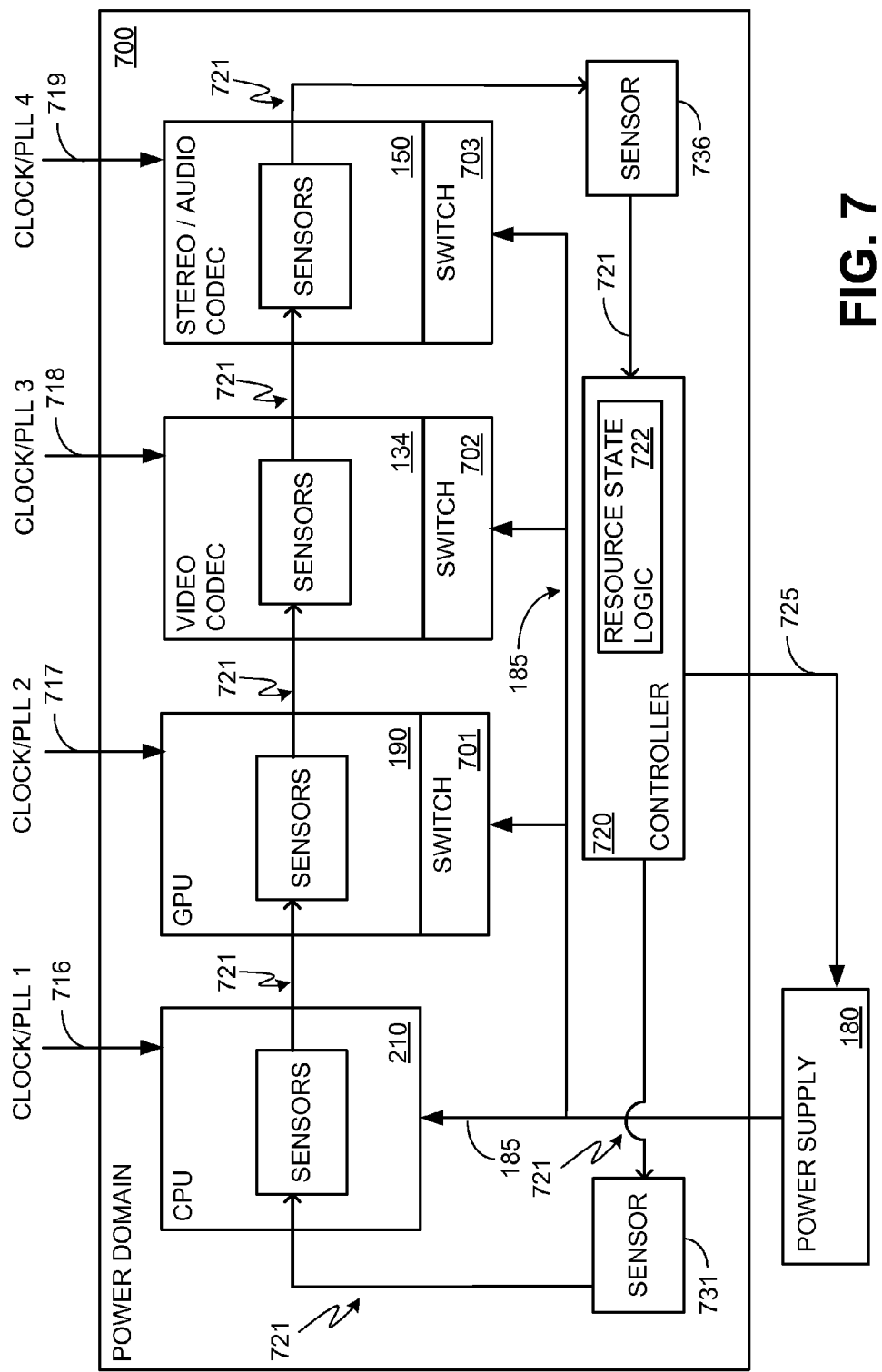
FIG. 7 is a schematic diagram of another example embodiment of a modified power domain.

FIG. 7 is a schematic diagram of an example embodiment of a modified power domain 700. The power domain 700 includes various disparate or heterogeneous processing resources that receive power over a shared power bus 185. The power domain 700 includes multicore processor 210, GPU 190, Video CODEC 134 and stereo/audio CODEC 150. During times when one or more of these disparate processing resources are idle, a controller 720 can adjust the input voltage on the shared power bus 185 by manipulating the control signal on connection 725 to the power supply 180 to reduce the power expended while still achieving a desired performance.

The power domain 700 receives multiple clock signals. In the illustrated embodiment, the power domain 700 receives a respective clock signal for each processing resource. A first clock signal input 716 is coupled to the CPU 210. A second clock signal input 717 is coupled to the GPU 190. A third clock signal input 718 is coupled to the video CODEC 134. A fourth clock signal input 719 is coupled to the stereo/audio CODEC 150. The respective clock signal inputs 716-719 are responsive to control inputs communicated from the hypervisor 240 to the respective phase-locked loop clock source. In alternative embodiments, the power domain 700 may be arranged with more or less functional blocks. Among these alternative embodiments a clock signal source may be shared among functional blocks that respond similarly to variations in the input voltage.

In the illustrated embodiment, the power domain 700 includes a bus 185 that provides a an adjustable input voltage to CPU 210, GPU 190, video CODEC 134, and stereo/audio CODEC 150. In the illustrated arrangement, the input voltage on bus 185 is not switched before being provided to the CPU 210. Unlike, the CPU 210, the input voltage on bus 185 is conveyed to the GPU 190, the video CODED 134 and stereo/audio CODEC 150 via switch 701, switch 702, and switch 703, respectively. A controller 720 provides a control signal via connection 725 to the power supply 180. The control signal is responsive to state information communicated on bus 721. The controller 720 includes resource state logic 722, which is arranged to change the control signal in a manner that results in a desired voltage at the power supply output. The resource state logic 722 responds in a desired and consistent way to state information received on bus 721. State information includes whether each of the GPU 190, the video CODEC 134, or stereo/audio CODEC 150 is powered on, off or in an intermediate, standby or low-power state. The adjusted or desired voltage is distributed to each of switches 701-703 to controllably provide the adjusted voltage to the GPU 190, the video CODEC 134 and stereo/audio CODEC 150. Dynamic use of these processing resources creates an opportunity to adjust an input parameter, such as the input voltage, the frequency of a clock, or both when a status change or change in state associated with a processing resource in the power domain 700 occurs.

The power domain 700 is further arranged with a set of sensors arranged with test circuits configured to determine the responsiveness of circuits proximal to each of the respective sensors. As illustrated, the set of sensors are coupled in series on a sensor bus 721 that starts and ends at the controller 720. Sensor 731 is located along the bus 721 in a circuit region between the controller 720 and multicore CPU 210. Similarly, sensor 736 is located along the bus 721 in a circuit region between stereo/audio CODEC 150 and the controller 720. Sensors on the bus 721 are arranged to provide an indicator or index with the responsiveness data. The indicator or index defines a corresponding circuit region or functional block in the power domain 700. The provided responsiveness information from the various circuit regions outside the processing resources or within the corresponding CPU 210, GPU 190, video CODEC 134 or stereo/audio CODEC 150 may be used by the resource state logic 722 or other logic circuits in the controller 720 to adjust the control signal on connection 725. Although a bypass path or circuit is not shown for simplicity of illustration, it should be understood that one or more of the sensors distributed about the power domain 700 may be augmented by such a bypass circuit or path. When so provided, embedded state information will be communicated along the bus 721, thereby avoiding the bypassed sensor or sensors, on the way to the controller 720.

Figure 8:
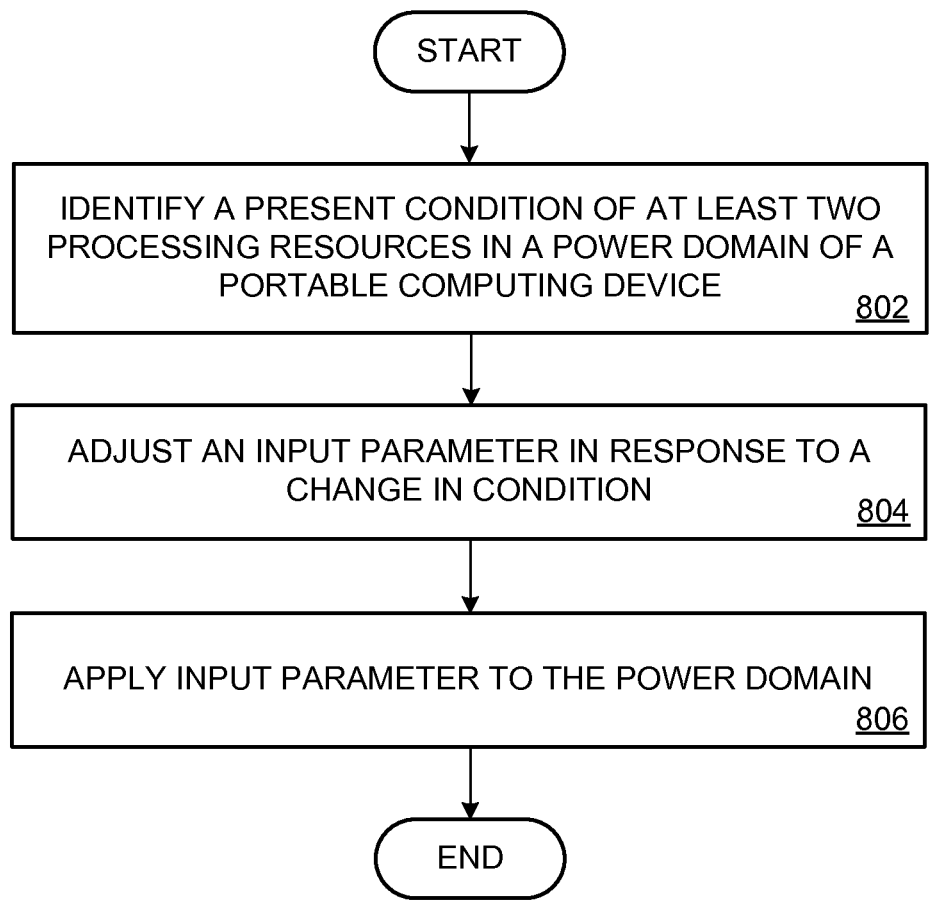
FIG. 8 is a flowchart illustrating an example embodiment of a method for dynamically controlling an input to a power domain in a portable computing device.

FIG. 8 is a flowchart illustrating an example embodiment of a method 800 for dynamically controlling an input to a power domain in a portable computing device. In block 802, a present condition of at least two processing resources in a power domain of the portable computing device is identified. As described, a present condition includes at least an on/off status for each of the processing resources. In some arrangements, the present condition will define a low-power or standby state. In still some other arrangements, the present condition may include additional information such as a clock frequency. In block 804, an input parameter is adjusted in response to a change in condition in the power domain identified in block 802. The adjustment includes an increase or decrease in the electrical potential applied by a power supply that is coupled to an input rail in the power domain. In some arrangements, the adjustment may further include an increase or decrease in the frequency of a clock signal coupled to a respective processing resource in the power domain. In block 806, the input parameter is applied to the power domain.

Certain steps in the processes or process flows described in this specification naturally precede others for the invention to function as described. However, the invention is not limited to the order of the steps described if such order or sequence does not alter the functionality of the invention.

That is, it is recognized that some steps may performed before, after, or in parallel (substantially simultaneously) with other steps without departing from the scope of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

Additionally, one of ordinary skill in power management within a portable computing device is able to identify appropriate hardware and/or circuits and/or identify appropriate logic and determinations to implement the disclosed invention without difficulty based on the flow charts and associated description in this specification. Therefore, disclosure of a particular set of program code instructions, decision thresholds or detailed hardware devices is not considered necessary for an adequate understanding of how to make and use the invention. The inventive functionality and aspects of the claimed processor-enabled processes and circuit architectures are explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored as one or more instructions or code on a computer-readable medium, such as a non-transitory processor-readable medium. Computer-readable media include data storage media.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present systems and methods, as defined by the following claims.

What is claimed is:

1. A method for dynamically controlling a power domain in a portable computing device, the power domain including processing resources that share a power source and a controller, the method comprising:
   monitoring present conditions of at least two processing resources in the power domain in the portable computing device;
   identifying a change in the present condition of one of the at least two processing resources in the power domain in the portable computing device, wherein identifying a change in the present condition of one of the at least two processing resources in the power domain is based on information received from a modified sensor chain protocol from a set of sensors coupled in series with each other on a sensor bus that starts and ends with the controller, wherein at least one sensor is coupled between the controller and a first processing resource, wherein at least one sensor is coupled between the controller and a last processing resource, and wherein at least one sensor is included within each of the processing resources;
   in response to the identified change in the present condition of one of the at least two processing resources, determining an adjustment to an input parameter to the power domain; and
   applying the determined adjustment to the input parameter to the power domain.

2. The method of claim 1, wherein identifying a change in the present condition of one of the at least two processing resources comprises identifying a change in a binary status indicator associated with the one of the at least two processing resources.

3. The method of claim 2, wherein the binary status defines one of a power applied state and a power not applied state.

4. The method of claim 1, wherein identifying a change in the present condition of one of the at least two processing resources comprises identifying a change in a clock frequency associated with the one of the at least two processing resources.

5. The method of claim 1, wherein identifying a change in the present condition of one of the at least two processing resources comprises receiving a signal indicating the change from a system power manager.

6. The method of claim 1, wherein applying the determined adjustment to the input parameter to the power domain comprises using resource hardware state logic.

7. The method of claim 6, wherein using resource hardware state logic includes generating a control signal directed to a power supply.

8. The method of claim 7, wherein the control signal directs the power supply to adjust a voltage.

9. The method of claim 1, wherein identifying a change in the present condition of one of the at least two processing resources comprises receiving a signal from a sensor associated with the one of the at least two processing resources.

10. The method of claim 9, wherein the signal from the sensor indicates a clock frequency.

11. The method of claim 9, wherein the signal from the sensor indicates an on/off status of a power supply.

12. The method of claim 9, further comprising executing masking logic to filter a received signal prior to determining an adjustment to the input parameter.

13. The method of claim 9, wherein the signal from the sensor bypasses a signal from a second sensor associated with a second one of the at least two processing resources.

14. The method of claim 1, wherein applying the determined adjustment to the input parameter to the power domain comprises communicating information to a scheduler that triggers the scheduler to modify task assignment logic for assigning tasks to the at least two processing resources.

15. The method of claim 14, wherein the information is selected from one or more of a voltage margin and a relative responsiveness of circuits in a one-to-one relationship with the at least two processing resources.

16. A power domain arranged in a portable computing device, comprising:
   at least two processing resources that are powered by a shared power source;
   a set of sensors arranged throughout the power domain; and
   a controller coupled to the at least two processing resources and configured to receive information from the set of sensors, the controller arranged to process the information with resource hardware state logic to generate a first control signal used by a power supply to determine a desired input voltage to the at least two processing resources in the power domain, wherein the set of sensors are coupled in series with each other on a sensor bus that starts and ends with the controller, wherein at least one sensor is coupled between the controller and a first processing resource, wherein at least one sensor is coupled between the controller and a last processing resource, and wherein at least one sensor is included within each of the processing resources, wherein the controller monitors the present conditions of the at least two processing resources, wherein the controller identifies a change in the present condition of one of the at least two processing resources based on information received from a modified sensor chain protocol from the set of sensors, wherein the controller determines an adjustment to an input parameter to the power domain in response to the identified change in the present condition of one of the at least two processing resources, and wherein the controller applies the determined adjustment to the input parameter to the power domain.

17. The power domain of claim 16, wherein the resource hardware state logic is responsive to a presence of a respective supply voltage for the at least two processing resources.

18. The power domain of claim 16, wherein the resource hardware state logic is responsive to a respective clock frequency for the at least two processing resources.

19. The power domain of claim 16, wherein the resource hardware state logic is responsive to state information embedded in a sensor chain signal protocol.

20. The power domain of claim 16, wherein the controller is further arranged to generate a second control signal used by a scheduler to modify task assignment logic for assigning tasks to the at least two processing resources.

21. A method for dynamically controlling a power domain in a portable computing device, the power domain including processing resources that share a power source and a controller, the method comprising:

monitoring present conditions of at least two processing resources in the power domain in the portable computing device;

receiving information that identifies a change in the present condition of one of the at least two processing resources in the power domain from a modified sensor chain protocol from a set of sensors coupled in series with each other on a sensor bus that starts and ends with the controller, wherein at least one sensor is coupled between the controller and a first processing resource, wherein at least one sensor is coupled between the controller and a last processing resource, and wherein at least one sensor is included within each of the processing resources;

in response to information received from the modified sensor chain protocol from the set of sensors, determining an adjustment to an input parameter to the power domain;

in response to the present conditions of the at least two processing resources, modifying a sensor bus in the power domain; and applying the determined adjustment to the input parameter to the power domain.

22. The method of claim 21, wherein monitoring present conditions of one of the at least two processing resources comprises monitoring at least two powered states of the processing resource.

23. The method of claim 21, wherein monitoring present conditions of one of the at least two processing resources comprises monitoring a clock frequency associated with the one of the at least two processing resources.

24. The method of claim 21, wherein modifying the sensor bus includes bypassing a sensor.

25. The method of claim 21, wherein modifying the sensor bus includes removing power from a sensor.

26. A power domain arranged in a portable computing device, comprising:

at least two processing resources that are powered by a shared power source;

a set of sensors arranged throughout the power domain; and a controller coupled to the at least two processing resources and configured to receive information from a modified sensor chain protocol from the set of sensors monitoring the at least two processing resources, the controller arranged to process the information with resource hardware state logic to generate a first control signal used by a power supply to determine a desired input voltage to the at least two processing resources in the power domain, wherein the set of sensors are coupled in series with each other on a sensor bus that starts and ends with the controller, wherein at least one sensor is coupled between the controller and a first processing resource, wherein at least one sensor is coupled between the controller and a last processing resource, and wherein at least one sensor is included within each of the processing resources, wherein the controller identifies a change in the present condition of one of the at least two processing resources based on information received from a modified sensor chain protocol from the set of sensors, wherein the controller determines an adjustment to an input parameter to the power domain in response to the identified change in the present condition of one of the at least two processing resources, and wherein the controller applies the determined adjustment to the input parameter to the power domain.

27. The power domain of claim 26, wherein the resource hardware state logic is responsive to a respective clock frequency for the at least two processing resources.

28. The power domain of claim 26, wherein the resource hardware state logic is responsive to state information embedded in a sensor chain signal protocol.

29. The power domain of claim 26, wherein the controller is further arranged to generate a second control signal used by a scheduler to modify task assignment logic for assigning tasks to the at least two processing resources.

30. The power domain of claim 29, wherein the scheduler modifies task assignment logic for assigning tasks in response to an identification of a processing resource that can perform the task with the input voltage and an available clock frequency.

* * * * *